United States Patent Office 3,812,080
Patented May 21, 1974

---

3,812,080
NICKEL AND COBALT DICYCLOHEXYLDITHIO-PHOSPHINATES AS FLAME-RETARDANTS FOR STYRENE POLYMERS
Allan Murray Feldman, Norwalk, Conn., assignor to American Cyanamid Company, Stamford, Conn.
No Drawing. Filed May 11, 1973, Ser. No. 359,389
Int. Cl. C08f 45/62
U.S. Cl. 260—45.75 R                                    6 Claims

ABSTRACT OF THE DISCLOSURE

Nickel and cobalt dicyclohexyldithiophosphinates have been found to be excellent flame-retardant additives for styrene polymers. Styrene polymers containing these additives and a method for the flame-proofing of styrene polymers with said additives, are disclosed.

BACKGROUND OF THE INVENTION

The use of various additives to impart flame-retardance to polymers has become more and more prevalent in recent years, due mostly to increasingly stringent federal and local flammability controls which have been placed on products produced from polymeric materials.

One of the most abundant and widely used classes of polymers are those containing a predominance of styrene. These polymers are used because of their ability to easily be formed into different configurations, e.g. molded articles.

One of the prime disadvantages of styrene polymers is, however, their tendency to burn readily upon exposure to heat or flame.

SUMMARY OF THE INVENTION

I have now found that the flammability of styrene polymers can be materially reduced by the incorporation therein of nickel (II) dicyclohexyldithiophosphinate or cobalt (II) dicyclohexyldithiophosphinate. These compounds unexpectedly impart flame-retardance to styrene polymers even though they contain only a minor amount of the elements usually associated with flame-retardant additives, i.e. boron, halogens, antimony phosphorous, etc. The fact that they contain metals which normally only act as oxidation promoters is also unique.

In addition to the fact that these additives unexpectedly impart flame-retardance to styrene polymers, is the further advantage that they, due to the fact that they contain no halogens, do not release deleterious amounts of corrosive gases during combustion.

The fact that these compounds inhibit burning is surprising. Styrene polymers burn by decomposing to monomer, the actual fuel, and usual free-radical inhibitors have been found ineffective at the high temperatures of burning. Many of said inhibitors, in fact, actually become initiators at these temperatures. Since the dithiophosphinates set forth herein are also known inhibitors, see U.S. Pat. Nos. 3,325,444, 3,293,208, the fact that they render styrene polymers flame-retardant is considered unwanted.

DESCRIPTION OF THE INVENTION INCLUDING PREFERRED EMBODIMENTS

As mentioned above, I have now discovered that both cobalt (II) dicyclohexyldithiophosphinate and nickel (II) dicyclohexyldithiophosphinate, when incorporated into styrene polymers, render the polymers flame-retardant. The dithiophosphinates are well known light stabilizers for polyolefins and are disclosed in U.S. Pat. Nos. 3,293,-208; 3,325,444; 3,238,248; and copending application, Ser. No. 185,877, filed Oct. 1, 1971, now U.S. Pat. No. 3,755,-396, issued Aug. 28, 1973, said references hereby being incorporated herein by reference. They may be added to the styrene polymers in flame-retarding amounts, e.g. from about 0.5% to about 10%, by weight, based on the weight of the styrene polymer. Mixtures of the two compounds, in a total weight concentration as set forth above and in any ratio, may also be used.

The dithiophosphinates may be incorporated into the styrene polymers via any known mixing technique. For this purpose, Banbury mixers, 2-roll mills, extruders, injection molders, etc., may be used.

The styrene polymers which are rendered flame-retardant by the incorporation therein of the above-identified compounds or mixtures thereof are those containing at least about 60%, by weight, based on the total weight of the polymer, of styrene. The polymer may constitute polystyrene per se or may constitute styrene copolymerized with up to 40%, by weight, same basis, of a monomer, or mixture of monomers, copolymerizable therewith. Exemplary of such applicable comonomers are acrylic acid, methacrylic acid; the esters of these acids such as ethyl acrylate, methyl methacrylate, etc.; other styrene monomers such as methyl styrene, o, m or p-chlorostyrene, etc.; acrylonitrile; vinyl chloride; vinylidene chloride; vinyl acetate; alcohol esters such as the allyl, cinnamyl, vinyl, etc., esters of such acids as acetic, butyric, oxalic, benzoic etc.; butadiene; divinyl benzene; ethyl vinyl ether; acrylamide; methyl vinyl ketone and the like.

Various other known additives may also be incorporated into the styrene polymers along with the dithiophosphinates. Such other additives include antioxidants, dyes, pigments, fillers, antistatic agents, UV absorbers, IR absorbers and the like.

The following examples are set forth for purposes of illustration only and are not to be construed as limitations on the present invention except as set forth in the appended claims. All parts and percentages are by weight unless otherwise specified.

EXAMPLE 1

To a suitable blending vessel are added 2.9 parts of nickel (II) dicyclohexyldithiophosphinate and 97.1 parts of polystyrene. The ingredients are dry blended and then hot pressed at 170° C. into sheets ⅛" thick. The sheets are cut into 1" diameter discs and subjected to a modification of the Oxygen Index Test, ASTM D2863-70. In this test modification, Oxygen Indices are determined in the "puddle burning" configuration using the disc in a cup shaped sample holder rather than the conventional "candle." An increase in Oxygen Index above the untreated base polymer is indicative of increased flame-retardance. The Oxygen Index of the resultant product is 4.2 above that of the polystyrene alone.

EXAMPLE 2

When the nickel compound of Example 1 is replaced by the corresponding cobalt (II) compound, the Oxygen Index of the resultant product is 3.5 above that of polystyrene alone.

The procedure of Example 1 is again followed except that different related metal complex additives are substituted for the dithiophosphinate thereof showing the uniqueness of the additives of the instant invention. The results are set forth in Table I, below.

TABLE I
(Comparative)

| Ex. | Additive, percent | Change in oxygen index |
|---|---|---|
| 3 | Zn (II) acetyl acetonate, 1.3 | 0.5 |
| 4 | Ni (II) acetyl acetonate, 1.3 | −0.1 |
| 5 | Cu (II) acetyl acetonate, 1.3 | 0.2 |
| 6 | Co (II) acetyl acetonate, 1.3 | −0.7 |
| 7 | Co (III) acetyl acetonate, 1.3 | −0.1 |
| 8 | [2,2'-thiobis(4-t-octylphenolate]aquo Ni, 2.6 | −1.2 |
| 9 | Dicyclopentadienyl iron, 0.93 | 0.5 |

Following the procedure of Examples 1 and 2, various styrene polymers are substituted for the polystyrene thereof. In each instance, the resultant composition shows an Oxygen Index 2.8–4.0 higher than the recorded value of the styrene polymer alone. The compositions are set forth in Table II, below.

TABLE II

| Ex. | Dithiophosphinate of example number | Styrene polymer |
|---|---|---|
| 10 | 1 | 60:40 copolymer of styrene and acrylonitrile. |
| 11 | 2 | 71:19:10 terpolymer of styrene, methyl methacrylate and ethyl acrylate. |
| 12 | 2 | 90:10 styrene-vinyl chloride copolymer. |
| 13 | 2 | 90:10 styrene-butadiene copolymer. |
| 14 | 1 | 70:30 styrene-methyl acrylate copolymer. |

I claim:
1. A composition comprising a styrene polymer containing a flame-retarding amount of (1) cobalt (II) dicyclohexyldithiophosphinate or (2) nickel (II) dicyclohexyldithiophosphinate.
2. A composition according to claim 1 wherein said styrene polymer contains cobalt (II) dicyclohexyldithiophosphinate.
3. A composition according to claim 1 wherein said styrene polymer contains nickel (II) dicyclohexyldithiophosphinate.
4. A composition according to claim 1 wherein said styrene polymer is polystyrene.
5. A composition according to claim 1 wherein said styrene polymer is polystyrene and contains cobalt (II) dicyclohexyldithiophosphinate.
6. A composition according to claim 1 wherein said styrene polymer is polystyrene and contains nickel (II) dicyclohexyldithiophosphinate.

References Cited
UNITED STATES PATENTS

| 3,755,396 | 8/1973 | Brooks | 260—45.75 |
| 3,325,444 | 6/1967 | Best et al. | 260—45.7 |
| 3,293,208 | 12/1966 | Millionis et al. | 260—45.7 |

HOSEA E. TAYLOR, Primary Examiner

V. P. HOKE, Assistant Examiner

U.S. Cl. X.R.

260—45.75 N